Oct. 2, 1934.  R. A. LISELLA ET AL  1,975,325
ANTISKID CHAIN AND MEANS FOR APPLYING AND REMOVING SAME
Filed Oct. 20, 1933   4 Sheets-Sheet 1
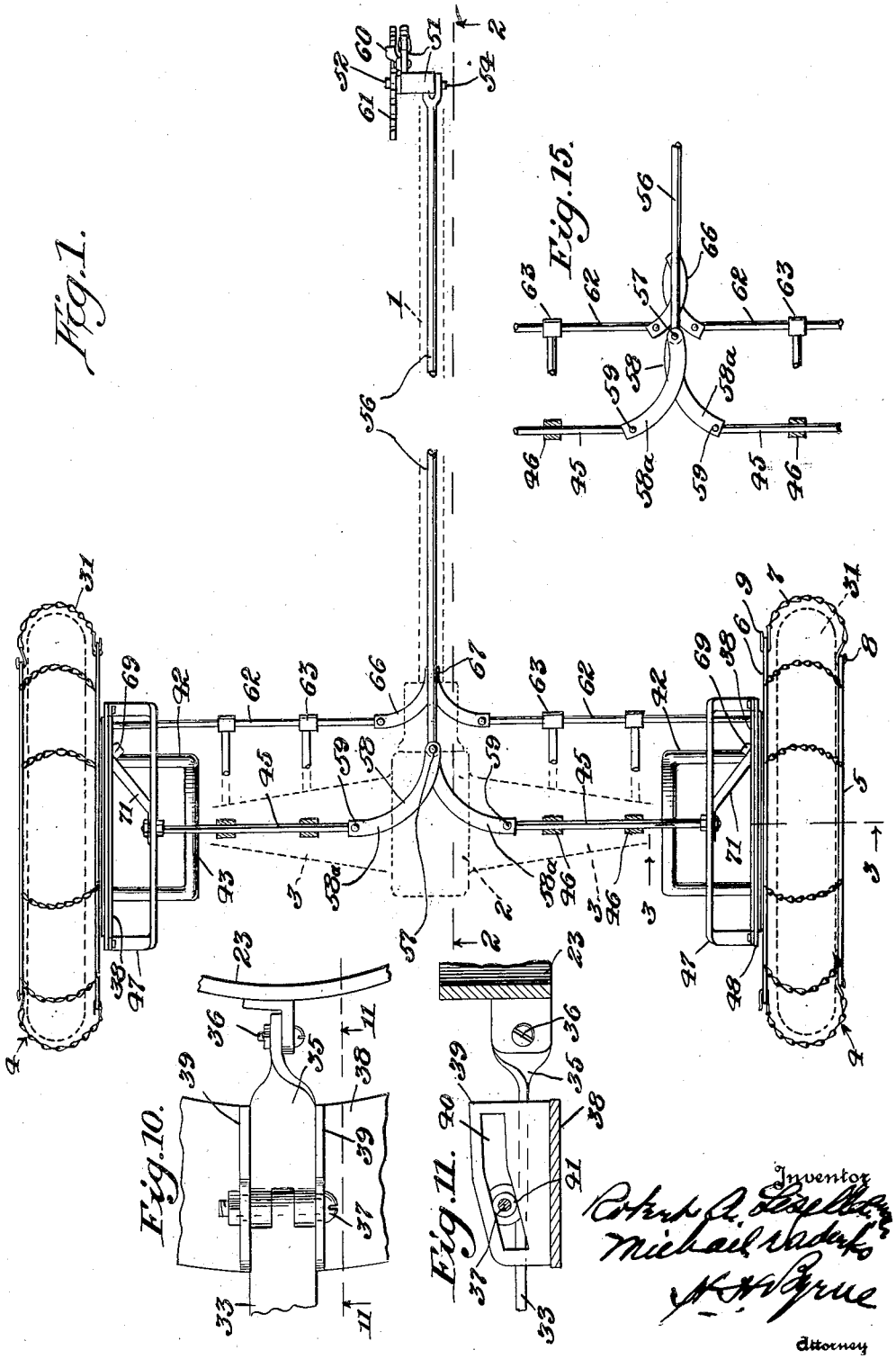

Oct. 2, 1934. R. A. LISELLA ET AL 1,975,325
ANTISKID CHAIN AND MEANS FOR APPLYING AND REMOVING SAME
Filed Oct. 20, 1933 4 Sheets-Sheet 2
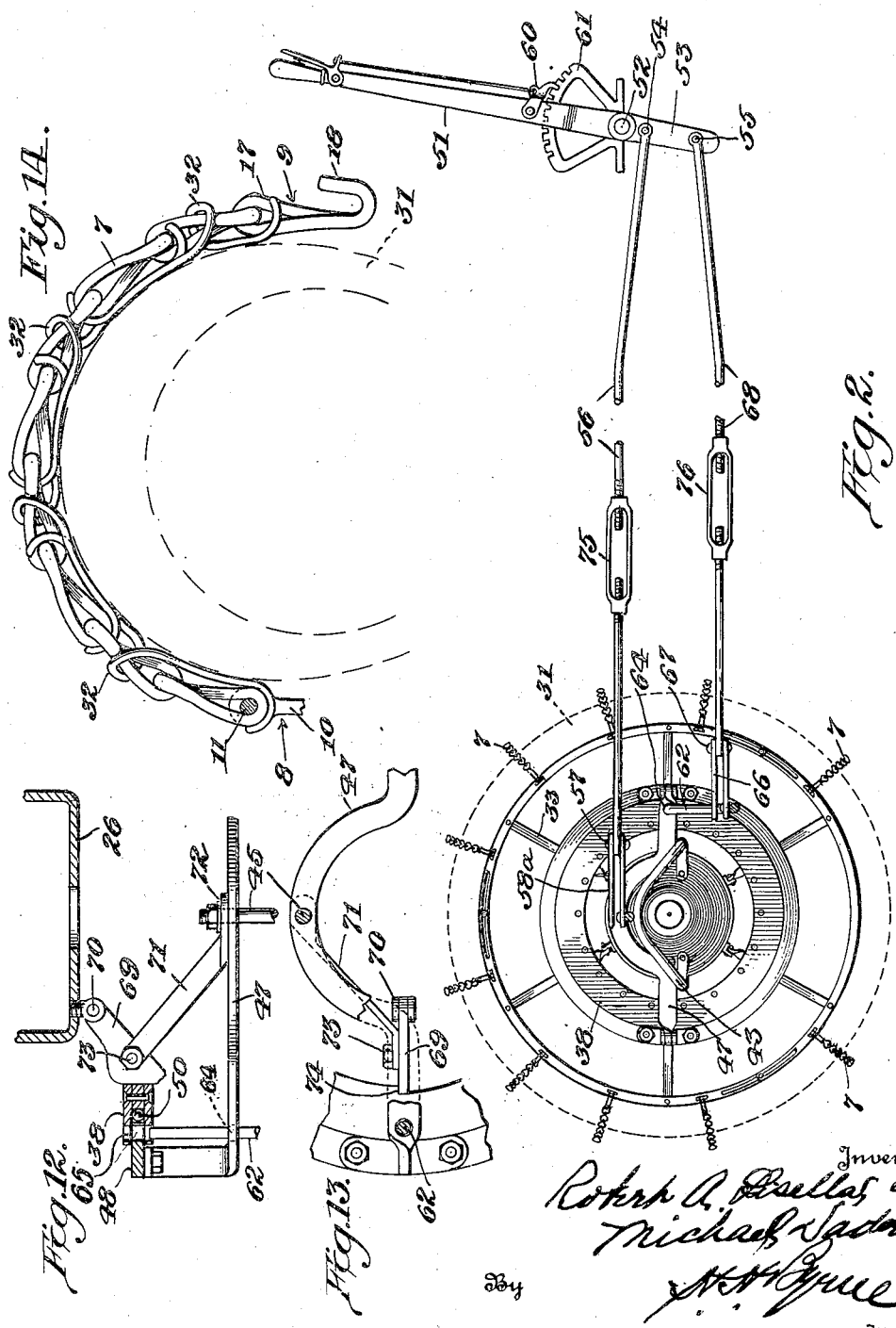

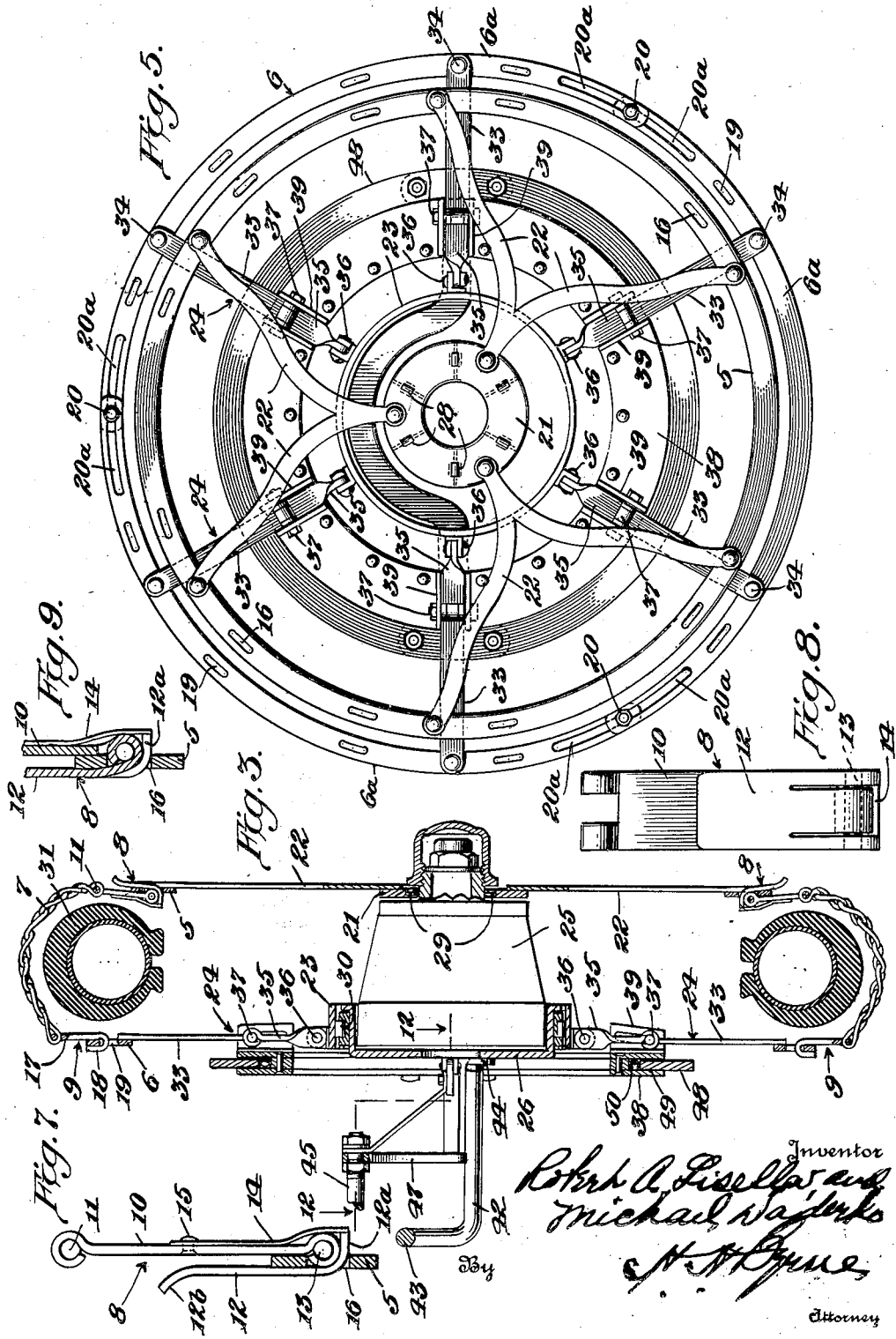

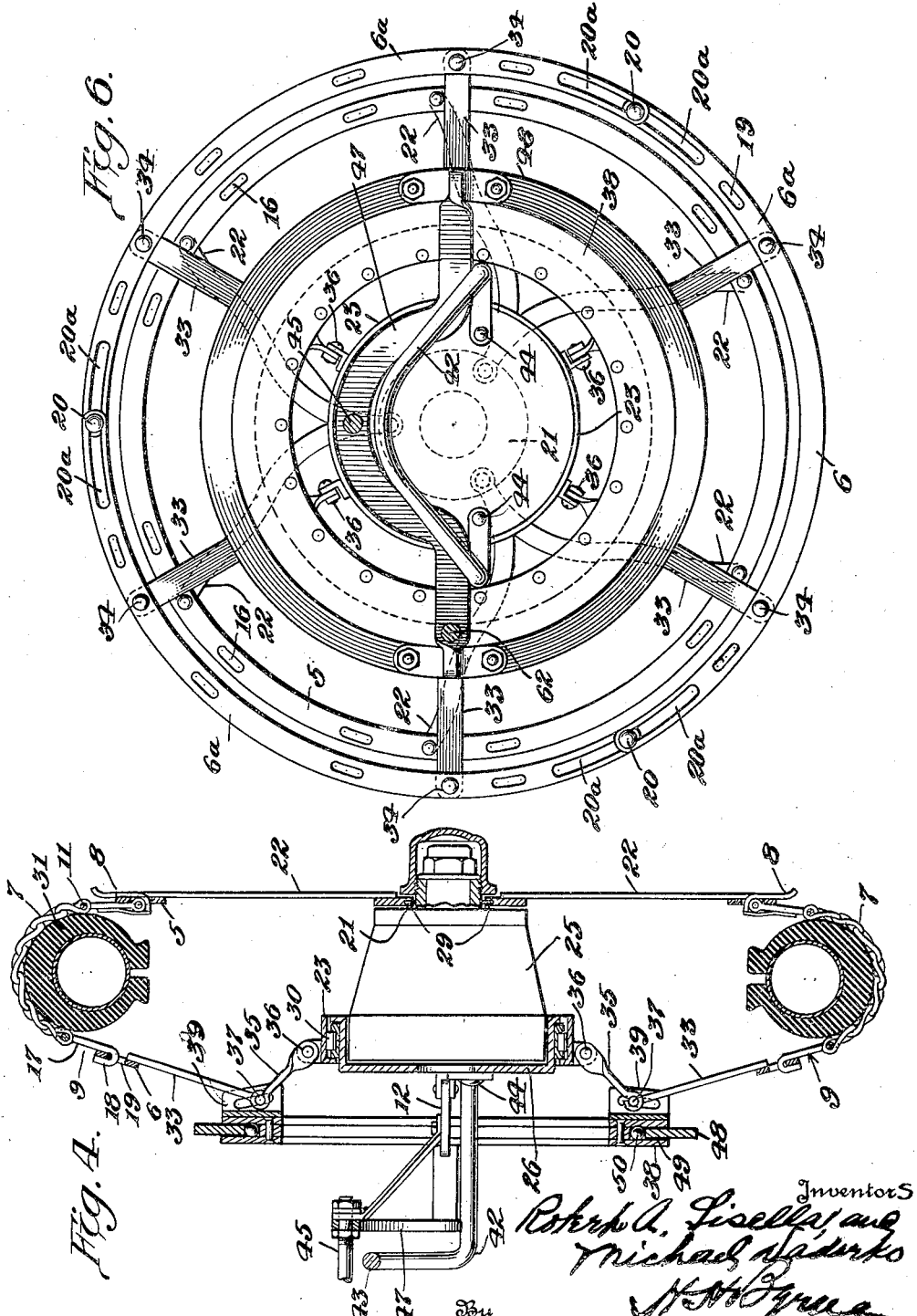

Patented Oct. 2, 1934

1,975,325

UNITED STATES PATENT OFFICE 1,975,325

ANTISKID CHAIN AND MEANS FOR APPLYING AND REMOVING SAME

Robert A. Lisella and Michael Daderko, Summit Hill, Pa., assignors of one-fourth to Guido Lisella, Summit Hill, Pa., and one-fourth to George A. Shutack, Nesquehoning, Pa.

Application October 20, 1933, Serial No. 694,472

6 Claims. (Cl. 152—14)

This invention relates to anti-skid chains for automobiles, and has for one of its objects to provide devices of this character which will be adapted to be supported in normally inoperative condition about the tires of the rear wheels of an automobile and which will be adapted to be easily and quickly changed from inoperative to operative condition. The invention has for a further object to provide means through the medium of which the driver may, without leaving his seat, easily and quickly change the anti-skid devices from one of its conditions to the other.

The invention has for a further object to provide anti-skid devices of the character stated which will be adapted to be mounted upon the rear wheels in a manner to permit them to be held against rotation with the wheels when they are in inoperative condition and to permit them to be rotated with the wheels when they are in operative condition.

The invention has for a further object to provide means for holding the anti-skid devices against rotation when in inoperative condition, this means being adapted to be rendered inoperative while the anti-skid devices are being changed from inoperative to operative condition, and adapted to be rendered operative while the anti-skid devices are being changed from operative to inoperative condition.

With the foregoing and other objects in view, the nature of which will appear as the description proceeds, the invention consists in the construction, combination and arrangements of parts hereinafter fully described and claimed, and illustrated in the accompanying drawings, wherein:

Figure 1 is a top plan view of the anti-skid devices and their operating means, those parts of an automobile necessary to illustrate the application of the invention being shown in broken lines, and the anti-skid devices and operating means being shown in inoperative condition.

Figure 2 is a sectional view taken on the vertical plane indicated by the line 2—2 of Figure 1.

Figure 3 is a sectional view of an enlarged scale taken on the vertical plane indicated by the line 3—3 of Figure 1, the hub, brake drum and tire of the wheel being shown in solid lines.

Figure 4 is a similar view with the anti-skid device shown in operative position.

Figure 5 is a view in side elevation of one of the anti-skid devices with its cross chains removed.

Figure 6 is a similar view of the anti-skid device from the opposite side thereof.

Figure 7 is a view partly in section and partly in elevation illustrating one of the hooks of the cross chains and the manner in which it is engaged with one of the chain-carrying rings.

Figure 8 is a view in side elevation of one of these hooks.

Figure 9 is a sectional view of one of these hooks.

Figure 10 is a detail view illustrating the manner in which the toggles and the operating ring therefor are connected together.

Figure 11 is a sectional view taken on the line 11—11 of Figure 10.

Figure 12 is a detail sectional view illustrating the means by which each anti-skid device is stopped after it is adjusted into inoperative condition, the section being taken on the line 12—12 of Figure 3.

Figure 13 is a view in elevation of the parts shown in Figure 12.

Figure 14 is a detail view of one of the cross chains, and;

Figure 15 is a top plan view of the operating and latching mechanism for the anti-skid devices.

Referring in detail to the drawings. and particularly to Figure 1, 1 designates the torque tube, 2 the differential housing, 3 the axle housings, and 4 the rear or drive wheels of an automobile.

In accordance with our invention, the rear wheels 4 are each equipped with an anti-skid device comprising an outer ring 5, an inner ring 6, and traction or cross elements 7 preferably in the form of chains which are connected at their ends by hooks 8 and 9 to the rings 5 and 6. As clearly shown in Figures 3, 7, 8 and 9, the hooks 8 comprise shanks 10 pivotally connected by pins 11 to the chains 7, bills 12 pivotally connected by pins 13 to the shanks, and springs 14 secured, as at 15, to the shanks and bearing against tail pieces 12ᵃ on the hooks. The bills 12 which pass through openings 16 in the ring 5, normally occupy a substantially parallel position with relation to the shanks 10, and they are releasably held in this, their operative, position by the springs 14. The bills 12 are movable from their parallel into an angular position with relation to the shanks 10, to permit the hooks 8 to be readily engaged with or disengaged from the ring 5. The free ends of the bills are curved to provide finger pieces 12ᵇ by which the bills may be conveniently moved from one of their positions to the other. The hooks 9 have shanks 17 pivotally connected to the chains, and bills 18 rigid with the shanks and passing through openings 19 in the ring 6.

The hooks 8 and 9 permit broken or badly worn cross chains to be readily removed from the rings 5 and 6, and permit new cross chains to be as easily connected to the rings, without removing the rings from the wheel.

The outer ring 5 is of fixed diameter. The inner ring 6 is, as clearly shown in Figures 5 and 6, of sectional formation, and the sections 6ª thereof are connected for adjustment relatively to vary the diameter of the ring. The sections 6ª of the ring 6 are connected together by bolts 20 passing loosely through slots 20ª formed in the ring sections. The ring 5 is connected to a bearing ring 21 by spokes 22, and the ring 6 is connected to a bearing ring 23 by toggles 24. The bearing ring 21 is mounted upon the outer end of the hub 25 of the wheel 4, and the bearing ring 23 is mounted upon the brake drum spider 26 of the wheel. The bearing rings 21 and 23 are loosely mounted upon the wheel 4, that is to say, they are mounted upon the wheel in such manner as to permit the wheel to rotate with relation thereto. The bearing rings 21 and 23 are, however, held against any lateral or radial movement with relation to the wheel. Anti-friction rollers 28 and 29 are interposed between the bearing ring 21 and the hub 25, and anti-friction rollers 30 are interposed between the bearing ring 23 and the spider 26. The bearing ring 21 and the spokes 22 hold the ring 5 against any radial movement with relation to the wheel 4. The bearing ring 23 and toggles 24 support the sections 6ª of the ring 6 for inward and outward radial adjustment with relation to the wheel 4, to the end that the cross chains 7 may be moved into and out of engagement with the tire. When the cross chains 7 are in engagement with the tire 31, as shown in Figure 4, the anti-skid device is in operative position and rotates with the wheel 4. When the cross chains 7 are out of engagement with the tire 31, as shown in Figure 3, the anti-skid device is in inoperative condition and the wheel 4 rotates with relation thereto. Elastic members 32 interwoven with the links of the cross chains 7, and engaging the hooks 8 and 9, as clearly shown in Figure 14, function to maintain the cross chains in arcuate formation with their concave sides facing the tire 31, to the end that the cross chains will be held out of engagement with the tire when the anti-skid device is in inoperative condition. When the anti-skid device is in this condition, its two lowermost cross chains are located at opposite sides of the vertical center of the wheel 4 and above the road, as shown in Figure 2. The distance between these cross chains is greater than the distance between any other pair of adjacent cross chains and provides what may be termed a "gap" in the lower side of the anti-skid device, through which gap the lower portion of the tire 31 extends for contact with the road.

The ring 6 is contracted to render the anti-skid device operative, and it is expanded to render the anti-skid device inoperative. The ring 6 is contracted or expanded through the medium of the toggles 24. The toggles 24 comprise long links 33 which are connected respectively as at 34 to the respective sections 6ª of the ring 6, and short links 35 which are pivoted, as at 36, to the bearing ring 23 and, as at 37, to the long links. The toggles 24 are operated through the medium of a ring 38 located opposite the inner side of the toggles and connected to the pivots 37 of the toggles. The ring 38 is provided on its outer side with lugs 39, and the pivots 37 of the toggles 24 are engaged with slots 40 in the lugs to connect the ring to the toggles. A pair of lugs 39 is provided for each of the toggles 24, and the knuckle of each of the toggles is arranged between the lugs of each pair, as best shown in Figures 10 and 11. The slots 40 are of angular formation and extend generally radially of the ring 38. Anti-friction sleeves 41 are mounted on the pivots 37 and contact with the walls of the slots 40.

When the ring 38 is moved in one direction it bends the toggles 24, and when it is moved in the opposite direction it straightens the toggles. The bending of the toggles 24 contracts the ring 6, with the result that the anti-skid device is rendered operative by the consequent movement of the cross chains 7 into engagement with the tire 31. The straightening of the toggles 24 expands the ring 6, with the result that the anti-skid device is rendered inoperative by the consequent movement of the cross chains 7 out of engagement with the tire 31.

The brake drum spiders 26 are connected to the axle housings 3 by braces 42 which have arcuate portions 43 bearing against the axle housings, and which are secured, as at 44, to the brake drum spiders. The toggle-operating rings 38 surround the axle housings 3 and the braces, and are supported from the axle housings for rotary and longitudinal movements with relation thereto. The supporting means for the rings 38 comprises rods 45 arranged parallel to the axle housings 3 and mounted for longitudinal movement in guides 46 carried by the axle housings. Brackets 47 secured to the outer ends of the rods 45, carry bearing rings 48 in which the toggle-operating rings 38 are rotatably mounted. The toggle-operating rings 38 are, as best shown in Figures 3 and 4, provided in their peripheries with grooves 49 for the reception of the bearing rings 48, and anti-friction balls 50 are arranged between the bearing rings and the bottom walls of the grooves.

A hand lever 51 located within convenient reach of the driver is fulcrumed at 52 and the lever extension 53 thereof has pivotal connections 54 and 55 with the two rods 56 and 68 which extend to and serve to actuate the anti-skid mechanism at the transmission casing. The rod 56 is connected to the pivot 57 of a toggle 58. The links 58ª of this toggle are pivotally connected, as at 59, to the inner ends of the rods 45, and they are of arcuate formation and curve forwardly from the inner ends of the rods 45. If the anti-skid devices are in inoperative condition, it is only necessary to rock the lever 51 rearwardly in order to render the anti-skid device operative. The lever 51 will, when rocked in this direction, move the rod 56 forwardly, and this movement of the rod will cause the remote ends of the toggle links 58ª to approach each other and draw the rods 45 inwardly. This movement of the rods 45 will move the rings 38 inwardly from the position in which they are shown in Figure 3 into the position in which they are shown in Figure 4, with the result that the toggles 24 will be operated to contract the rings 6 of the anti-skid devices, and thus effect movement of the cross chains 7 into engagement with tires 31. After the cross chains 7 have been moved into engagement with the tires 31, the lever 51 is secured, by the engagement of a latch 60 with a notched sector 61, against movement to hold the anti-skid devices in operative condition. If the anti-skid devices are in operative condition it is only necessary to rock the lever 51 rearwardly in order to render the anti-skid devices inoperative. The rocking of the lever 51 in this direction will move the rod 56 rearwardly, and this movement of the rod will cause the remote ends of the toggle links 58ª to move away from each other and force the rods 45 outwardly. This movement of the rods 45 will move the rings 38 outwardly from the position in which they are shown in Figure 4 into the position in which they are shown in Figure 3, with the result that the toggles 24 will be operated to expand the rings 6 of the anti-skid devices, and thus effect the movement of the cross chains 7 out of engagement with the tires 31. After the cross chains 7 have been moved out of engagement with the tires 31, the lever 51 is secured by the latch 60, against movement to hold the anti-skid devices in inoperative condition.

The anti-skid devices are held against rotation when in inoperative condition by bolts 62 which are slidably mounted in guides 63 carried by the rear axle housings 3, and which pass through openings 64 in the brackets 47 and through openings 65 in the toggle-operating rings 38. The bolts 62 are arranged in parallel relation to the rods 45, and the inner ends thereof are connected by a toggle 66 similar to the toggle 58. The pivot 67 of the toggle 66 is connected by the rod 68 to the lever 51, whereby the bolts 62 will be retracted during the rearward rocking movement of the lever, and whereby they will be projected during the forward rocking movement of the lever. It will thus be understood that the bolts 62 will be disengaged from the rings 38 while the rings are being moved to effect the adjustment of the anti-skid devices into operative condition, and that the bolts will be engaged with the rings while the rings are being moved to adjust the anti-skid devices into inoperative condition. The bolts 62 engage the toggle-operating rings 38 when the gaps in the anti-skid devices are at the lower sides of the wheels 4, whereby to permit the tires 31 to engage the road without danger of any of the cross chains 7 engaging the road. Stops 69 pivoted, as at 70, to the drums 26, and links 71 connected, as at 72 to the brackets 47 and pivoted, as at 73, to the stops, together with shoulders 74 on the toggle-operating rings 38, constitute means which, during the adjustment of these rings to render the anti-skid devices inoperative, stops the rotation of the anti-skid devices with their gaps at the bottoms of the wheels and with the openings 65 of the toggle actuating rings registering with the bolts 62. During the adjustment of the toggle-operating rings 38 to render the anti-skid devices operative, the stops 69 are moved out of engagement with the shoulders 74 by the links 71, whereby to free the anti-skid devices for rotation when their cross chains are engaged with the tires 31. During the adjustment of the toggle-operating rings 38 to render the anti-skid devices inoperative, the stops 69 are moved into the paths of the shoulders 74 by the links 71, whereby to arrest the rotation of the anti-skid devices, as described.

The rods 56 and 68 are of sectional formation, and the sections thereof are connected by turn buckles 75 and 76 respectively. If desired, any suitable supporting and guiding means, not shown, may be provided for the rods 56 and 68.

From the foregoing description, taken in connection with the accompanying drawings, it should be apparent that the cross chains 7 are supported for swinging movement about the pivots 11 into and out of engagement with the tires 31, that the cross chains are swung into engagement with the tires when the toggles 24 are operated in one direction, and that the cross chains are swung out of engagement with the tires when the toggles are operated in the opposite direction. When the anti-skid devices comprising these pivots, cross chains and toggles, are in inoperative condition, they are held against rotation with the wheels by the latch bolts 62, and the cross chains 7 are held out of engagement with the tires 31 by the elastic members 32. To change the anti-skid devices from inoperative to operative condition, and to free them for rotation with the wheels, it is only necessary for the driver to rock the lever 51 rearwardly. To change the anti-skid devices from operative to inoperative condition, and to latch them against rotation, it is only necessary for the driver to swing the lever 51 forwardly. It will be further understood, the anti-skid devices may be adjusted into operative or inoperative condition while the automobile is in motion.

What is claimed as new is:

1. An anti-skid device for vehicle wheels and means for applying and removing the same while the vehicle is moving comprising a solid annular member located adjacent to and concentric with the vehicle wheel, an expansible and contractile annular member located on the opposite side of the wheel, spring supported chain sections connecting said annular members and overlying the thread of the wheel tire, and manually controlled means for contracting and expanding said annular member whereby to apply or remove said chain sections as and for the purpose set forth.

2. An anti-skid device for vehicle wheels and means for applying and removing the same while the vehicle is moving comprising a solid annular member located on one side of and concentric with the vehicle wheel, an expansible and contractile annular member located on the opposite side of the wheel, spring supported chain sections connecting said annular members and overlying the tread of the wheel tire, arms connected to said expansible member, a ring swiveled on the hub of said wheel, toggle connections between said arms and said ring, and manually controlled swiveled means for actuating said expansible band whereby to move said toggles for contracting or expanding the annular member whereby to apply or remove said chain sections as and for the purpose set forth.

3. An anti-skid device for an automobile wheel, comprising traction elements, means at one side of the wheel having said elements connected thereto, means at the opposite side of the wheel having said elements connected thereto and adapted to be operated to move said elements into or out of engagement with the tire, said first and second means being loosely mounted upon the wheel and rotating therewith when said elements are in engagement with the tire, and manually operated means for holding said first and second means against rotation when said elements are out of engagement with the tire.

4. An anti-skid device for an automobile wheel, comprising bearing rings supported at opposite sides of the wheel, said rings being adapted to be rotated with the wheel and to be held against rotation therewith, traction elements, means carried by one of said bearing rings and having said elements connected thereto, members connected to the other of said bearing rings and to said elements and operable to move said elements into or out of engagement with the tire, and means for holding the bearing rings against rotation with the wheel when said elements are out of engagement with the tire.

5. An anti-skid device for vehicle wheels and means for applying and removing the same while the vehicle is in motion comprising a solid annular ring member swiveled on one side of the wheel, and expansible and contractile ring member swiveled on the opposite side of the wheel, cross chains connected to said rings, and overlying the tires of said wheels, spring elements connected to said chains to support them in arcuate form, means for expanding or contracting one of said ring members and means whereby said ring members may be caused to rotate with said wheel or be prevented from rotating therewith as set forth.

6. An anti-skid device for vehicle wheels and means for applying and removing the same while the vehicle is in motion comprising a solid annular member located adjacent to and concentric with the tire of the vehicle wheel, a bearing ring for supporting said member on said wheel an expansible and contractile annular member located on the opposite side of the wheel, a bearing ring for supporting said member on said wheel, toggle levers connecting said annular member and said bearing ring, an operating ring connected to the joints in said toggles and means for moving said operating ring axially to actuate said toggles, traction chains connected to said annular members and overlying the tire and adapted to contract with the tire when in use and to be retracted therefrom when not in use, as set forth.

ROBERT A. LISELLA.
MICHAEL DADERKO.